US011931890B2

(12) United States Patent
Bechar et al.

(10) Patent No.: US 11,931,890 B2
(45) Date of Patent: Mar. 19, 2024

(54) HUMAN-ROBOT GUIDING SYSTEM FOR AGRICULTURAL OBJECTS DETECTION IN UNSTRUCTURED AND NOISY ENVIRONMENT BY INTEGRATED LASER AND VISION (71) Applicant: The State of Israel, Ministry of Agriculture & Rural Development, Agricultural Research Organization (ARO) (Volcani Institute), Rishon Lezion (IL)

(72) Inventors: Avital Bechar, Mazkeret Batya (IL); Victor Bloch, Moshav Ora (IL); Roee Finkelshtain, Yarkona (IL)

(73) Assignee: THE STATE OF ISRAEL, MINISTRY OF AGRICULTURE & RURAL DEVELOPMENT, AGRICULTURAL RESEARCH ORGANIZATION (ARO) (VOLCANI INSTITUTE), Rishon Lezion (IL)

( * ) Notice: Subject to any disclaimer, the term of this patent is extended or adjusted under 35 U.S.C. 154(b) by 58 days.

(21) Appl. No.: 17/767,082

(22) PCT Filed: Oct. 12, 2020

(86) PCT No.: PCT/IB2020/059567
§ 371 (c)(1),
(2) Date: Apr. 7, 2022

(87) PCT Pub. No.: WO2021/070158
PCT Pub. Date: Apr. 15, 2021

(65) Prior Publication Data
US 2022/0362950 A1    Nov. 17, 2022

Related U.S. Application Data (60) Provisional application No. 62/913,188, filed on Oct. 10, 2019.

(51) Int. Cl.
*B25J 11/00*       (2006.01)
*A01D 46/30*       (2006.01)
(Continued)

(52) U.S. Cl.
CPC ............ *B25J 19/022* (2013.01); *A01D 46/30* (2013.01); *A01G 3/08* (2013.01); *B25J 9/1697* (2013.01);
(Continued)

(58) Field of Classification Search
CPC . A61P 35/00; C12Q 1/6886; C12Q 2600/112; C12Q 2600/154; C12Q 1/6869;
(Continued)

(56) References Cited

U.S. PATENT DOCUMENTS

| 4,519,193 A | 5/1985 | Yoshida et al. |
| 9,043,011 B2 * | 5/2015 | Kudas ..................... F01D 5/225 700/160 |

(Continued)

FOREIGN PATENT DOCUMENTS

| CN | 102914967 A | 2/2013 |
| CN | 104968195 B | 10/2015 |

(Continued)

OTHER PUBLICATIONS

Correll et al., Building a distributed robot garden, 2009, IEEE, p. 1509-1516 (Year: 2009).*

(Continued)

*Primary Examiner* — McDieunel Marc
(74) *Attorney, Agent, or Firm* — Rivka Friedman (57) ABSTRACT A human-robot system and method for performing an agricultural task, the system including: a robotic manipulator with an agricultural tool coupled to an end effector thereof; an imaging device adapted to capture imagery of a target, the imaging device mechanically coupled to the end effector; a (Continued)

laser distance sensor adapted to measure a distance between the manipulator and the target, the laser distance sensor mechanically coupled to the end effector and collocated with the imaging device; and a control unit including: a processing unit, a monitor and a human-machine interface (HMI), wherein the processing unit is configured to display the imagery on the monitor and to receive markings from the HMI and calculate a trajectory for the manipulator to perform the agricultural task with the tool.

11 Claims, 10 Drawing Sheets

(51) Int. Cl.
*A01G 3/08* (2006.01)
*B25J 9/16* (2006.01)
*B25J 19/02* (2006.01)

(52) U.S. Cl.
CPC ......... *B25J 11/0055* (2013.01); *B25J 19/023* (2013.01)

(58) Field of Classification Search
CPC ........ C12Q 2600/156; C12Q 2600/166; G01N 33/57434; G01N 2800/52; G01N 2800/50; G01N 2500/10
See application file for complete search history.

(56) References Cited

U.S. PATENT DOCUMENTS

| | | | |
|---|---|---|---|
| 9,092,698 B2* | 7/2015 | Buehler | B25J 9/1676 |
| 9,232,687 B2* | 1/2016 | Bassett | A01C 7/203 |
| 10,231,376 B1* | 3/2019 | Stanhope | F16M 13/022 |
| 10,597,235 B2* | 3/2020 | Clucas | B65G 67/02 |
| 10,813,265 B2* | 10/2020 | Stanhope | A01B 69/007 |
| 11,151,810 B2* | 10/2021 | Ryan | G05B 23/0232 |
| 11,212,955 B2* | 1/2022 | Schoeny | A01B 47/00 |
| 11,365,068 B2* | 6/2022 | Wertenberger | B25J 9/1697 |
| 11,570,943 B2* | 2/2023 | North | G01B 21/22 |
| 11,602,093 B2* | 3/2023 | Stanhope | A01B 69/008 |
| 11,624,829 B2* | 4/2023 | Dasika | A01D 34/283 356/4.01 |
| 2006/0213167 A1 | 9/2006 | Koselka et al. | |
| 2017/0173790 A1 | 6/2017 | Tan et al. | |
| 2020/0261297 A1* | 8/2020 | Strydom | G06T 7/60 |

FOREIGN PATENT DOCUMENTS

| | | |
|---|---|---|
| CN | 108718704 A | 11/2018 |
| CN | 108811766 A | 11/2018 |
| EP | 2086308 A1 | 8/2009 |
| WO | 2016055552 A1 | 4/2016 |

OTHER PUBLICATIONS

Baudoin, Information architecture for sensor and mobile robotic systems facing the humanitarian demining problem, 2005, IEEE, p. 1-23 (Year: 2005).*

Narvaez et al., A Survey of Ranging and Imaging Techniques for Precision Agriculture Phenotyping, 2017, IEEE, p. 2428-2439 (Year: 2017).*

Belforte et al., Robot design for applications in intensive agriculture, 2002, IEEE, p. 519-523 (Year: 2002).*

* cited by examiner

HUMAN-ROBOT GUIDING SYSTEM FOR AGRICULTURAL OBJECTS DETECTION IN UNSTRUCTURED AND NOISY ENVIRONMENT BY INTEGRATED LASER AND VISION

FIELD OF THE INVENTION

The present invention relates to agricultural robotics and in particular to a human-robot guiding system for agricultural objects detection in an unstructured and noisy environment by integrated laser and vision.

BACKGROUND OF THE INVENTION

Robots are perceptive machines that can be programmed to perform a variety of agricultural tasks, such as cultivating, transplanting, spraying, and selective harvesting. Agricultural robots have the potential to enhance the quality of fresh produce, lower production costs and reduce the drudgery of manual labor. However, in agriculture, the environment is highly unstructured. The terrain, vegetation, landscape, visibility, illumination and other atmospheric conditions are not well defined; they continuously vary, have inherent uncertainty, and generate unpredictable and dynamic situations. Therefore, autonomous robots in real-world, dynamic and un-structured environments still yield inadequate results, and the promise of automatic and efficient autonomous operations has fallen short of expectations in such environments.

SUMMARY OF THE INVENTION

According to the present invention there is provided a human-robot system for performing an agricultural task, the system including: a robotic manipulator with an agricultural tool coupled to an end effector thereof; an imaging device adapted to capture imagery of a target, the imaging device mechanically coupled to the end effector; a laser distance sensor adapted to measure a distance between the manipulator and the target, the laser distance sensor mechanically coupled to the end effector and collocated with the imaging device; and a control unit including: a processing unit, a monitor and a human-machine interface (HMI), wherein the processing unit is configured to display the imagery on the monitor and to receive markings from the HMI and calculate a trajectory for the manipulator to perform the agricultural task with the tool.

According to further features in preferred embodiments of the invention described below the processing unit is further configured to: receive the measured distance from the laser distance sensor, and provide instructions to the manipulator for performing the agricultural task with the agricultural tool based on the markings.

According to still further features in the described preferred embodiments the markings include marking a target point on the imagery of the target. According to further features the markings further include marking a tool orientation for performing the agricultural task.

According to further features the trajectory includes instructions for moving the manipulator from a scanning location to an execution location at which the agricultural tool effects the agricultural task on the target at a location corresponding to the marking on the image of the target. According to further features the instructions include instructions to the manipulator to move along the trajectory.

According to further features an orientation of the target is extracted from the target imagery using a computer vision algorithm. According to further features a desired orientation of the agricultural tool is calculated using the computer vision algorithm.

According to another embodiment there is provided a human-robot method for performing an agricultural task, the method including: providing a robotic manipulator with an agricultural tool, an imaging device and a laser distance sensor manually coupled to an end effector of the manipulator; receiving, at a control unit, imagery of a target from the imaging device; marking, using a human-machine interface (HMI) of the control unit, a target point on the imagery of the target; receiving, at the control unit, distance information from the laser distance sensor; calculating, by the control unit, a trajectory for the robotic manipulator to traverse from a scanning location to an execution location at which the agricultural tool is able to effect the agricultural task on the target at the target point; and effecting the agricultural task by moving the robotic manipulator and applying the agricultural tool to the target point of the target.

According to further features the method further includes extracting an orientation of the target from the target imagery using a computer vision algorithm. According to further features the method further includes calculating a desired orientation of the agricultural tool using the computer vision algorithm.

According to further features the method further includes marking a tool orientation for performing the agricultural task using the HMI.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

In light of the challenges mentioned above, introducing a human operator into an agricultural robotic system can help improve performance and simplify the robotic system. One of the novel aspects of the current invention is the integration of laser and vision sensing techniques with human-robot integrated system (HRI) to detect agricultural objects such as tree branches, fruits, weeds and perform accurately and at low cycle time various agricultural activities in real time, single step operations and without complicated setup and preparation. Examples of agricultural activities that can be performed with the current invention include, but are not limited to: pruning, harvesting, picking, weeding and spraying.

For example, orchard pruning is a labor-intensive task which requires more than 25% of the labor costs. The main objectives of this task are to increase exposure to sun light, control the tree shape and remove unfitted branches. In most orchards this task conducted once a year and up to 20% of the branches are removed selectively.

There is provided a system including a camera and a laser that transfers an image to a human operator who marks target agricultural objects on the screen showing the captured image. The system extracts the relative coordinates of the target, in 3 dimensions, using integration of laser sensor and camera data and brings a robotic end-effector to that position in order to perform the agricultural operation. An image processing algorithm extracts the object features and separates it from the background.

The advantage of the invention is its ability to perform the agricultural operation in real time, at low cycle time and high spatial and angular accuracy, and without specific preparation and setup. In addition, the current invention minimizes the requirements to deal with obstacles in the trajectory of the robotic arm due to the inherent nature of the invention and the location of the camera and laser sensor.

The principles and operation of human-robot guiding system according to the present invention may be better understood with reference to the drawings and the accompanying description.

Materials and Methods

Figure 1:
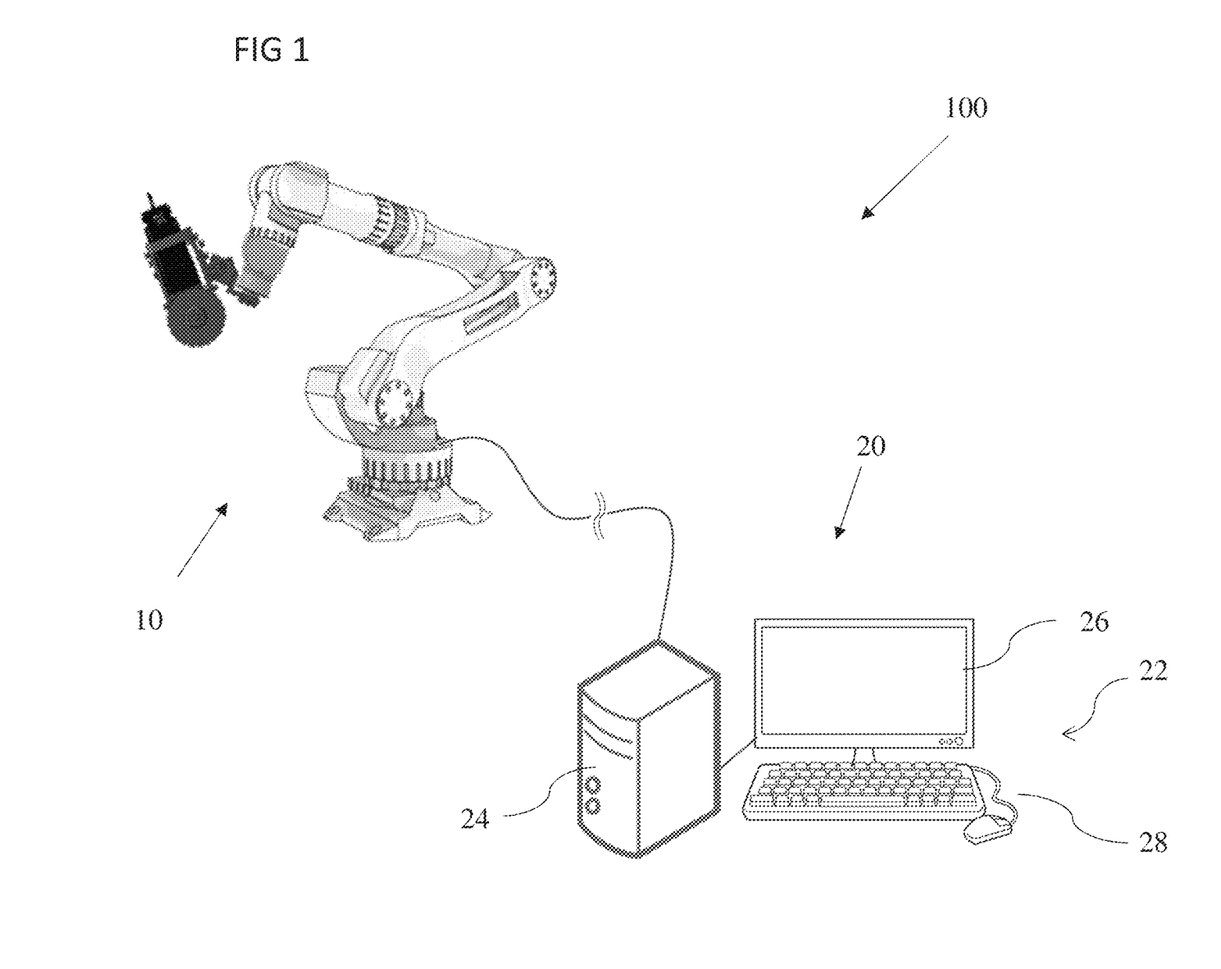
FIG. 1 is a simplified diagram of the instant human-robot system.

FIG. 1 illustrates a simplified diagram of the instant human-robot system 100. The system consists of a hardware component 10 and a control component 20. The hardware component includes (see FIG. 2, 2A) a manipulator (e.g. a Motoman manipulator such as a Motoman MH5LF manufactured by Yasaka Motoman Robotics headquartered in Miamisburg, Ohio, USA), a color camera, a single beam laser distance sensor. The control component 20 includes a computer (processing unit) and a Human-Machine Interface (HMI). The camera and the laser sensor are mounted on the manipulator's end-effector. The camera and sensor are aligned parallel one to the other.

The system is a semi-autonomous system (or a Human-Robot system) in which the human operator provides certain input but does not control the sensor or the robot directly, as in other cases. The instant technique employs a computer to control the camera and laser sensor to extract the object location and object features by interpreting the human actions and to guide the robotic arm to perform the agricultural operation. This enables low cycle time at high accuracy and low workload.

Human-Robot Collaborative System

Figure 2:
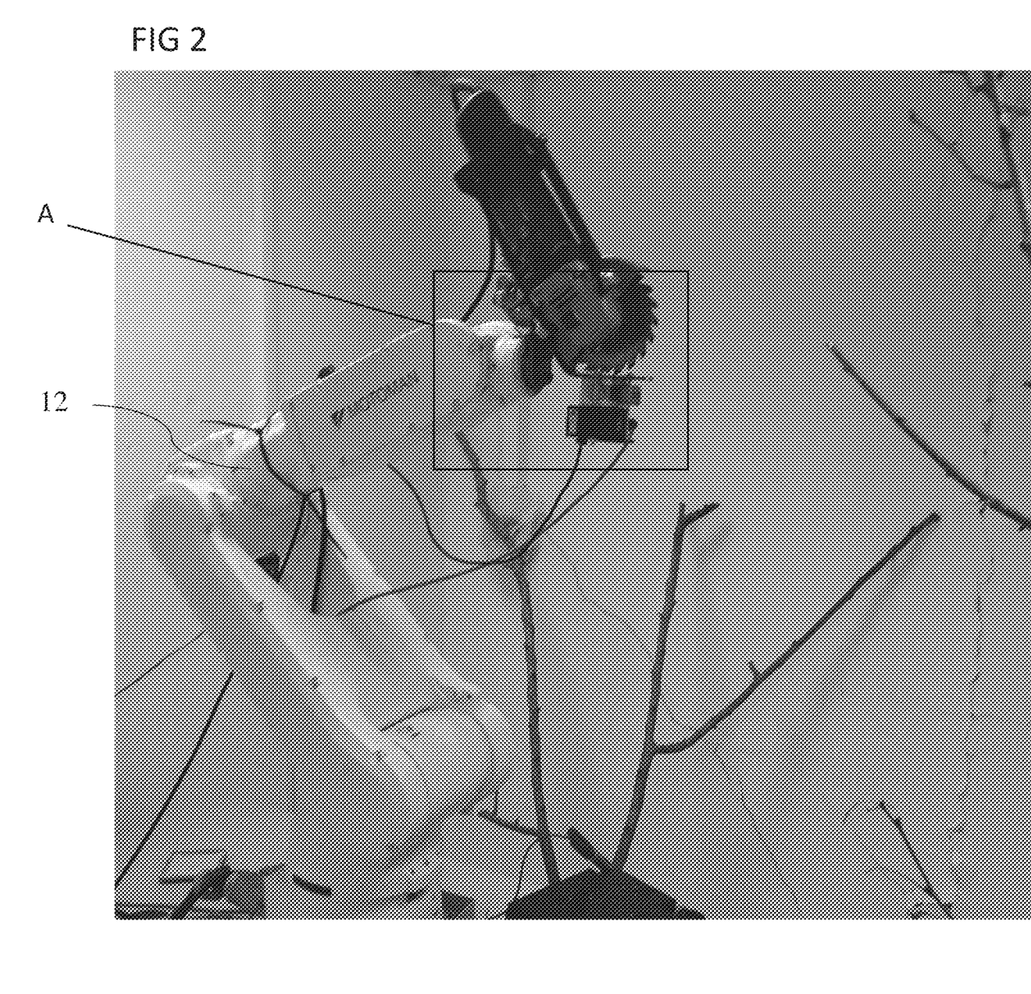
FIG. 2 is a photograph of an exemplary embodiment of the robot system 10 of the instant innovation.
Figure 2A:
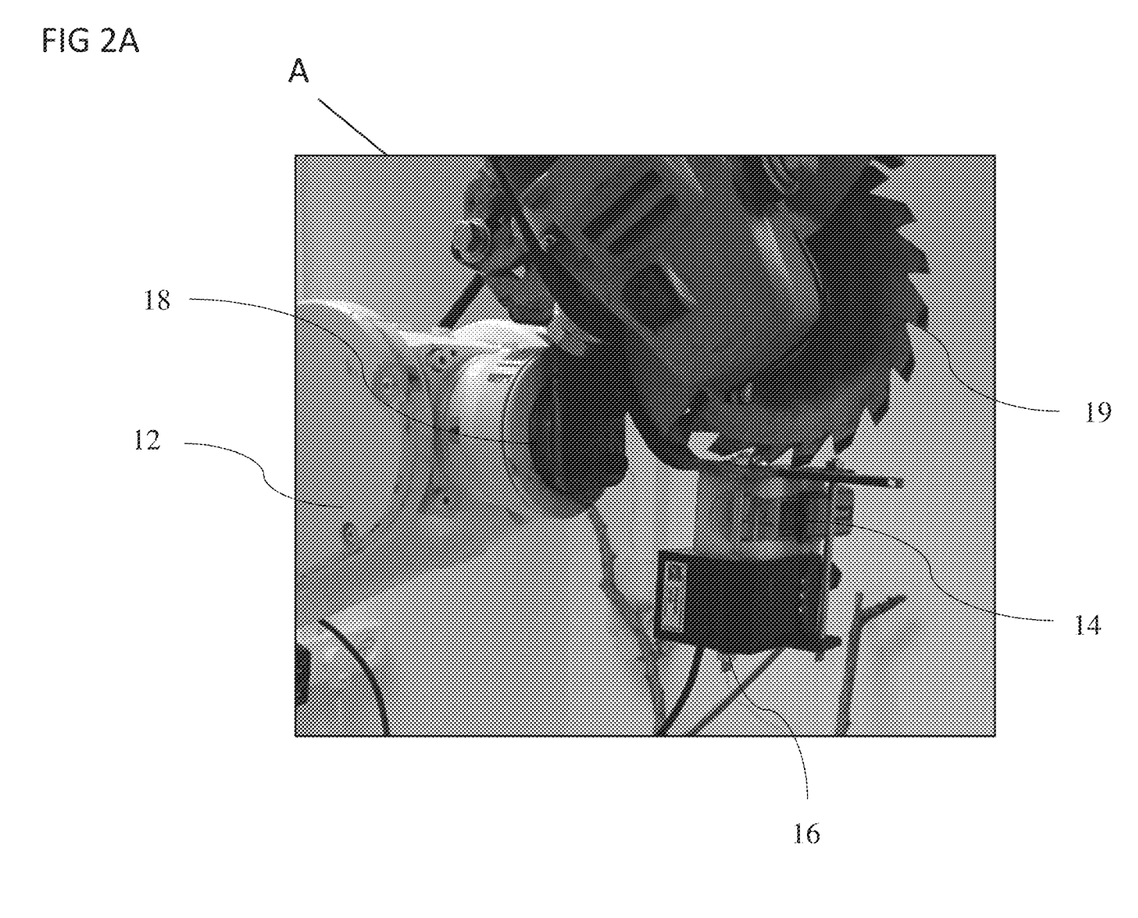
FIG. 2A is a magnified view of area A of FIG. 2.

FIG. 2 is a photograph of an exemplary embodiment of the robot system 10 of the instant innovation. FIG. 2A depicts a magnified view of area A of FIG. 2. One exemplary embodiment of the innovative system is a human-robot collaborative system for selective tree pruning. The system consists of a Motoman manipulator 12, a color camera 14, a single beam laser distance sensor 16, and a tool 19 (to perform the required/selected agricultural operation). In the Figure, the end-effector 18 is integrated with a circular saw 19 for selective pruning. The camera and laser sensor are mounted on the manipulator's end-effector, aligned parallel to each other. On the human-control side of the system 20 is an HMI 22 and a computer 24 (see FIG. 1). The control component includes human input peripherals (keyboard, mouse, pointing device, joystick etc.) and/or a screen 26. The screen 26 may simply display the target image/imagery or it may a touchscreen device and hence an HMI itself. Hereafter, the term HMI, unless specified otherwise, includes monitor 26. The term 'imagery' is used herein to refer to a still image, a video image, an enhanced or otherwise processed image or set of images. Images from the imaging device may be recorded or live-streamed (i.e. real-time) images.

Figure 3:
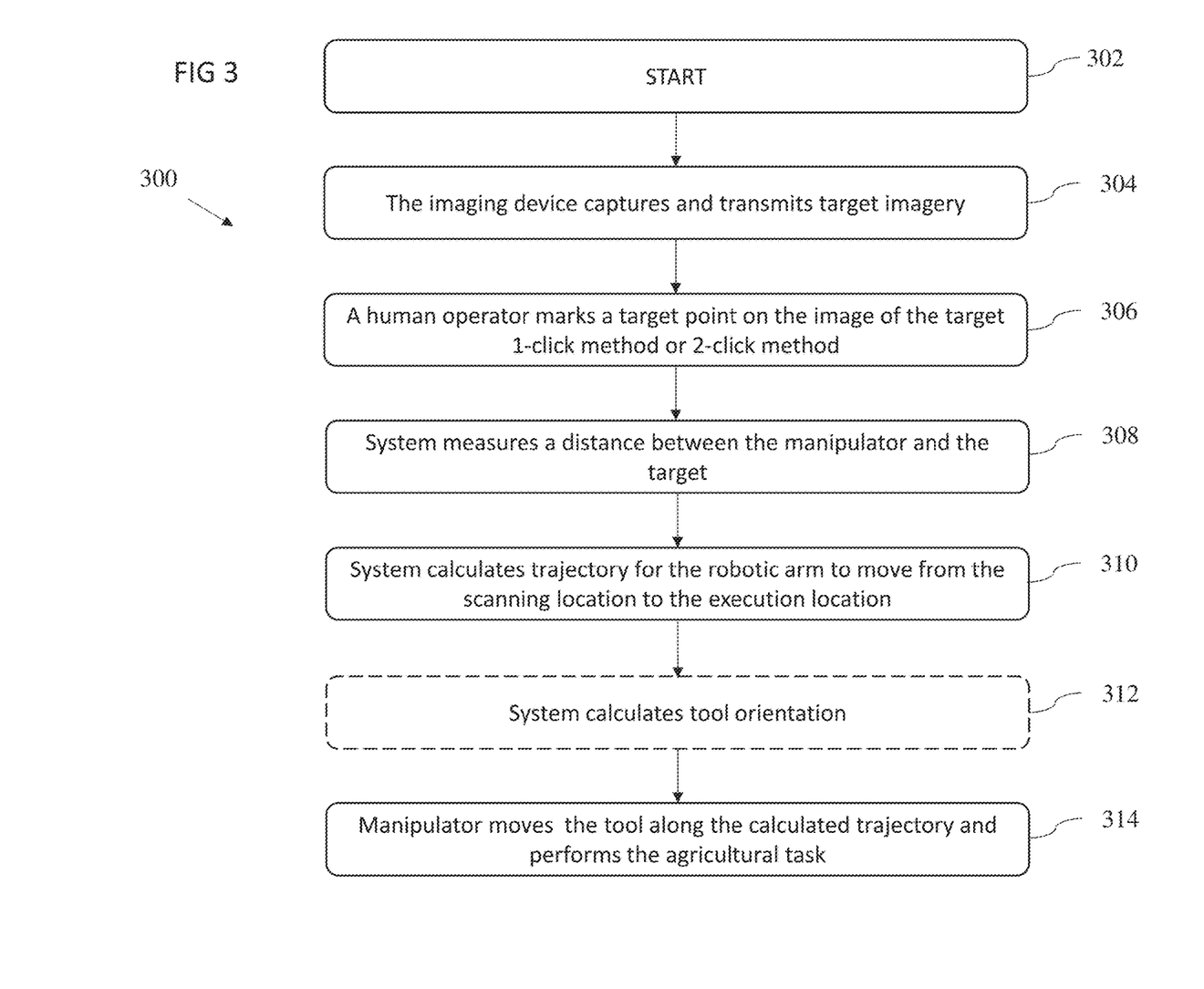
FIG. 3 is a flow diagram of an exemplary embodiment of a human-robot process for performing an agricultural task.

FIG. 3 is a flow diagram of an exemplary embodiment of a human-robot process for performing an agricultural task. A process 300 starts at step 302. The exemplary system works in two phases. In the first phase, at step 304, the manipulator moves to, or is in, a scanning location and the camera 14 captures and transmits/transfers a 2D image of the tree to a human operator via a wired or wireless (not shown) communications component. In some implementations, the human operator can be on-site, operating the hardware locally. With an on-site operator, the device may be connected to the control component in a wired manner. In other implementations, the human operator interacts with the robot from a remote location. With a remote operator, the device may be in wireless communication with the computer and HMI.

Regardless of whether the operator is locally or remotely located, the operator, at step 306, uses the HMI to mark the branches to be removed on the display. Preferably, the human operator marks a target point on the target branch. Any type of input interface known in the art can be used to effect the selection of the branches on the image displayed on the monitor.

Exemplarily, a pointing device can be used. A pointing device is an input interface (specifically a human-machine interface device) that allows a user to input spatial (i.e. continuous and multi-dimensional) data to a computer. Graphical user interfaces (GUI) allow the user to control and provide data to the computer using physical gestures by moving a hand-held mouse or similar device across the surface of the physical desktop and activating switches on the mouse. Movements of the pointing device are echoed on the screen by movements of the pointer (or cursor) and other visual changes. Common gestures are point and click and drag and drop.

While the most common pointing device by far is the mouse, many more devices have been developed. However, the term "mouse" is commonly used as a metaphor for devices that move the cursor or make markings on the display. Another input method is via a touchscreen interface. Fingers or a stylus can be used to select the various branches.

In the second phase, the system works autonomously: at step 308 the laser sensor 16 measures the distance between the manipulator and the target branch. At step 310 the processing unit of the control component/unit calculates a trajectory from the scanning location of the manipulator to the cutting point or execution location. If the tool orientation has not been provided (see '1-click method' below) then the angular orientation of the tool is calculated by the system in step 312. (Step 312 is denoted by a broken line as it is conditional step that is not always required.) Once this trajectory has been calculated (and the angular orientation of the tool received or calculated), the robotic arm, at step 314, performs the corresponding moves and cuts the branch at the prescribed location.

Image processing and computer vision algorithms are in the innovative process. Image processing, separately and in combination with the distance information from the laser distance sensor, is used to extract object features (e.g. edges, boundaries, learned features, etc.) to separate potential target objects (e.g. branches) from the background.

When using image processing and computer vision, many functions are unique to the specific application at hand. There are, however, typical functions (discussed hereafter) that are found in many computer vision systems, some of which are employed in the instant system.

A digital image is produced by one or several image sensors, which, besides various types of light-sensitive cameras, include range sensors, tomography devices, radar, ultra-sonic cameras, etc. Depending on the type of sensor, the resulting image data is an ordinary 2D image, a 3D volume, or an image sequence. The pixel values typically correspond to light intensity in one or several spectral bands (grey images or color images), but can also be related to various physical measures, such as depth, absorption or reflectance of sonic or electromagnetic waves, or nuclear magnetic resonance. In the instant application, the image sensor (or course, more than one sensor can be employed) captures a 2D image or 2D imagery. The laser distance sensor (sometimes called a laser range finder or LRF) provides depth information which the system (i.e. the processing unit) uses to calculate coordinates in three dimensions. This information is used to calculate, inter alia, the trajectory for the robot arm manipulator.

Before a computer vision method can be applied to image data in order to extract some specific piece of information, it is usually necessary to process the data (sometimes referred to as pre-processing) in order to assure that it satisfies certain assumptions implied by the method. Examples of such pre-processing include, but are not limited to: re-sampling to assure that the image coordinate system is correct; noise reduction to assure that sensor noise does not introduce false information; contrast enhancement to assure that relevant information can be detected; and scale space representation to enhance image structures at locally appropriate scales.

Image features at various levels of complexity are extracted from the image data. Typical examples of such features include, but are not limited to: lines, edges and ridges; and localized interest points such as corners, blobs or points. More complex features may be related to texture, shape or motion.

Another stage includes detection and/r segmentation. At some point in the processing a decision is made about which image points or regions of the image are relevant for further processing. Examples are: selection of a specific set of interest points; segmentation of one or multiple image regions that contain a specific object of interest; segmentation of image into nested scene architecture comprising foreground, object groups, single objects or salient object parts (also referred to as spatial-taxon scene hierarchy), while the visual salience is often implemented as spatial and temporal attention; segmentation or co-segmentation of one or multiple videos into a series of per-frame foreground masks, while maintaining its temporal semantic continuity.

High-level processing is another step. At this step the input is typically a small set of data, for example a set of points or an image region which is assumed to contain a specific object. The remaining processing deals with, for example: verification that the data satisfy model-based and application-specific assumptions; estimation of application-specific parameters, such as object pose or object size; image recognition, i.e. classifying a detected object into different categories; image registration, i.e. comparing and combining two different views of the same object.

Typically, the last stage is decision making. Making the final decision required for the application, for example: pass/fail on automatic inspection applications; match/no-match in recognition applications; flag for further human review in medical, military, security and recognition applications. Here, decision making may include, but is not limited to: recognizing a target object (e.g. a tree branch); plotting objects in Cartesian space/coordinates; mapping markings made on the image by the operator using the HMI onto real-world objects; calculating angular orientation for tool application (e.g. at what angle the saw should cut the branch); discerning objects obstructing a potential or plotted trajectory and so on.

Experiments

Two experiments were conducted on the exemplary system. In the first experiment, two types of motion planning were investigated: i) a linear motion between the initial location of the tool (also referred to a scanning location) and the cutting point (also more generally referred to as execution location) in global Cartesian coordinates and, ii) in robot joint space. Task space (or Cartesian space) is defined by the position and orientation of the end-effector of a robot. Joint space is defined by a vector whose components are the translational and angular displacements of each joint of a robotic link.

In the second experiment, two types of human-robot collaboration methods were examined: a) the human subject marked two points in the picture received from the end-effector camera, the first point indicates the location of the cut on the branch and the second point is marked to calculate the orientation of the cutting tool when pruning the branch; and, b) the human subject marks a single point in the picture received from the end-effector camera to denote the location of the cut on the branch. A computer vision algorithm extracts the orientation of the branch and calculates the desired orientation of the cutting tool.

Results and Discussion of Exemplary Implementation

Experiment 1

Figure 4:
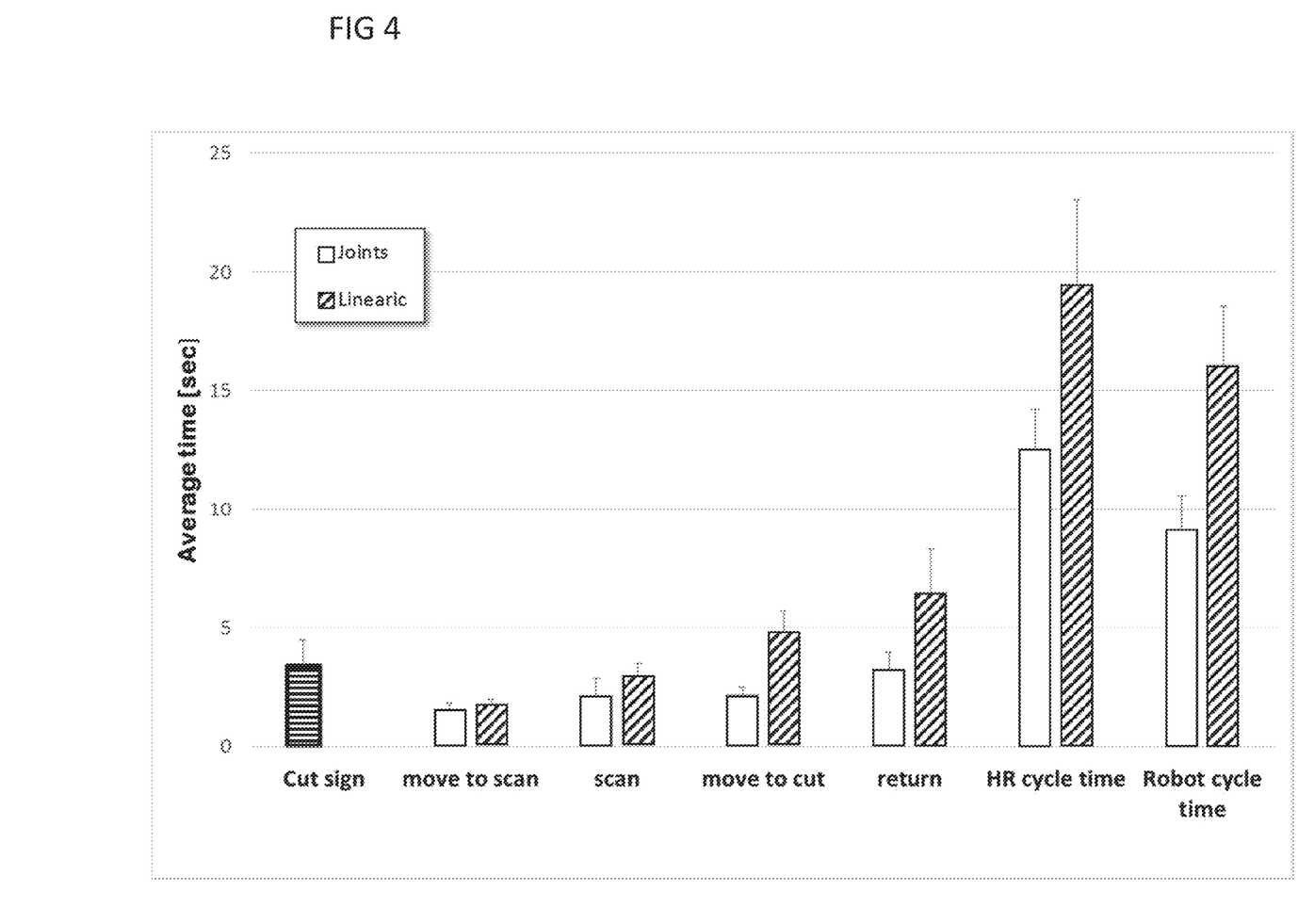
FIG. 4 is a graph that depicts the mean time of the different movement stages for the linear motion and in the robot joint space movement.

FIG. 4 is a graph that depicts the mean time of the different movement stages for the linear motion ('linearic') and in the robot joint space movement ('joints'). The robot trajectory consists of four stages: (1) a movement to the scanning location ('move to scan'), (2) performing the scan ('scan'), (3) movement to the branch and performing the cut ('move to cut'), and (4) return to the initial position ('return'). In addition, the human marking of the selected location in the branch is shown and denoted as 'cut sign'. The human marking stage takes place between stage (2) and (3) above.

Two cycle times are presented in the graph: the cycle time including the human actions ('HR cycle time') and the cycle time of the robot movement ('robot cycle time'). Since the human action and the robot movement can be performed simultaneously, the actual cycle times will be similar to the robot movement cycle time. In all movement stages the times were shorter in the robot joint space than in linear movement.

The average robot movement cycle time was 9.2 s for the robot joint space movement and was shorter by 43% than in the linear movement (16.1 s). The advantage of the linear movement is that the chances of encountering obstacles is lower since the end effector is moving along the line of site marked by the human operator and by its nature it is obstacle free. Nevertheless, the differences in the trajectories between the two movement methods were minimal.

Experiment 2

Figure 5:
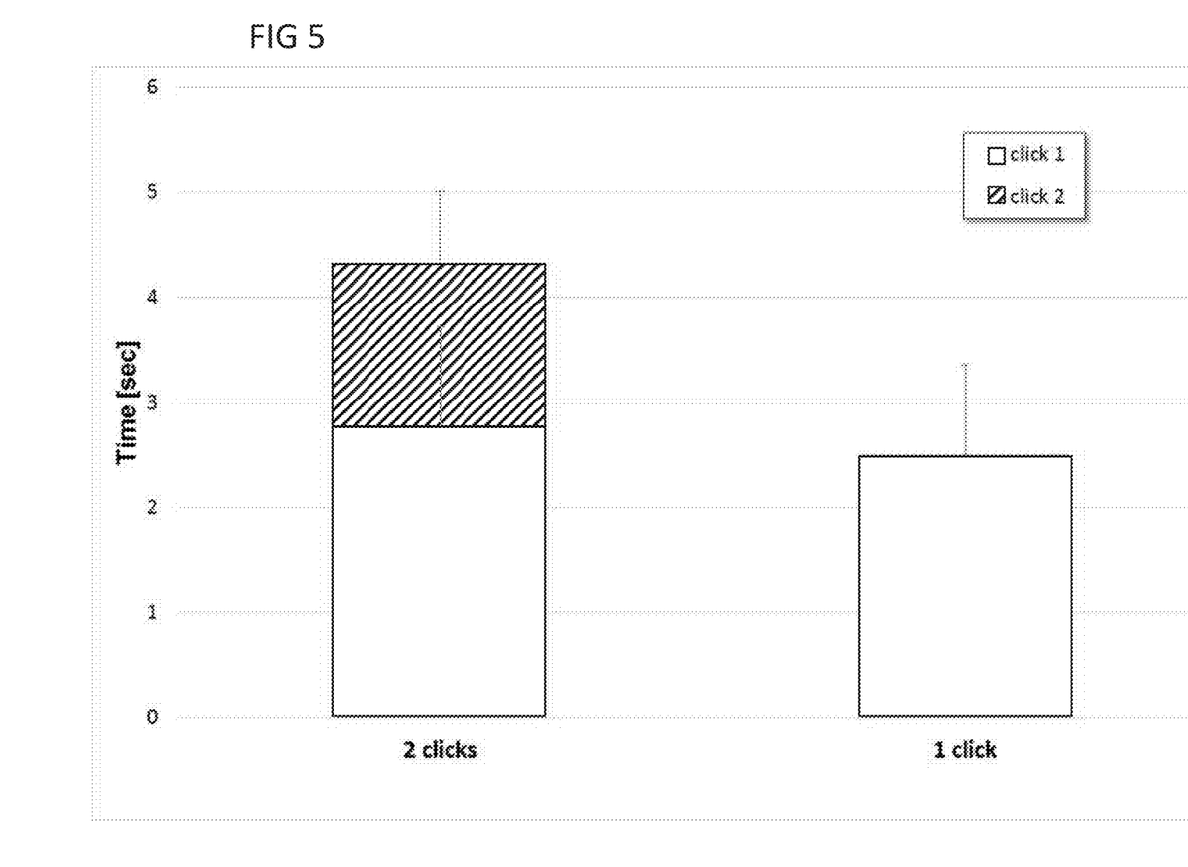
FIG. 5 is a graph of the results of Experiment 2.

FIG. 5 depicts a graph of the results of Experiment 2. In the second experiment, the response times of the human operators were measured for the two collaboration methods denoted as '1 click method' and '2 clicks method'. With the '1 click method', the human operator marked only the location of the cut on the branch and the orientation of the cut was determined by a computer vision algorithm. With the '2 clicks method', the human operator marked two points on the branch, one for the location of the cut and the second for the orientation.

The first mark (click 1) in both methods was similar, 2.51 s and 2.76 s for the '1 click method' and '2 clicks method' respectively with no significant difference. The second mark (click 2) was significantly shorter (1.56 s) in comparison to the first mark. For all human subjects, the total time to retrieve the location and orientation of the cut was shorter in the '1 click method' in comparison to the '2 clicks method' by approximately 40% (in average 2.51 s in the '1 click method' and 4.31 s in the '2 clicks method'). Although there was no difference in the accuracy of the cut location between the two methods, the orientation in the '2 clicks method' was more accurate than in the '1 click method'.

SUMMARY AND CONCLUSIONS

The designed system was examined in two experiments evaluating the performance of two types of motion planning and two types of human-robot collaboration methods.

An actual average cycle time of 9.2 s was achieved when the human operator actions and the robot were performing simultaneously (a real-time implementation). The results also revealed that the average time required to determine the location and orientation of the cut was 2.51 s in the '1 click method'

The finding implies that in an efficient environment and working method, one human operator can supervise three to four tree pruning robots and increase the total production rate.

Although the current cycle time achieved is acceptable, reducing the cycle time can be achieved by optimizing the scanning stages. In addition, a multi target (branches) procedure, as opposed to the heretofore described procedure of selecting and cutting one target (branch) at a time, can significantly improve the per branch cycle time, the per batch time and overall work time per tree and orchard.

The manipulator can be mounted on an autonomous vehicle or a manned tractor. The advantages of the system over fully manual pruning conducted today include the overall activity being faster as well as reducing the number of workers by 70-80%, while maintaining the same level of performance. Accordingly, implementation of the instant system will reduce the hard labor element from the agricultural task of tree pruning.

Figures 6A, 6B, 6C:
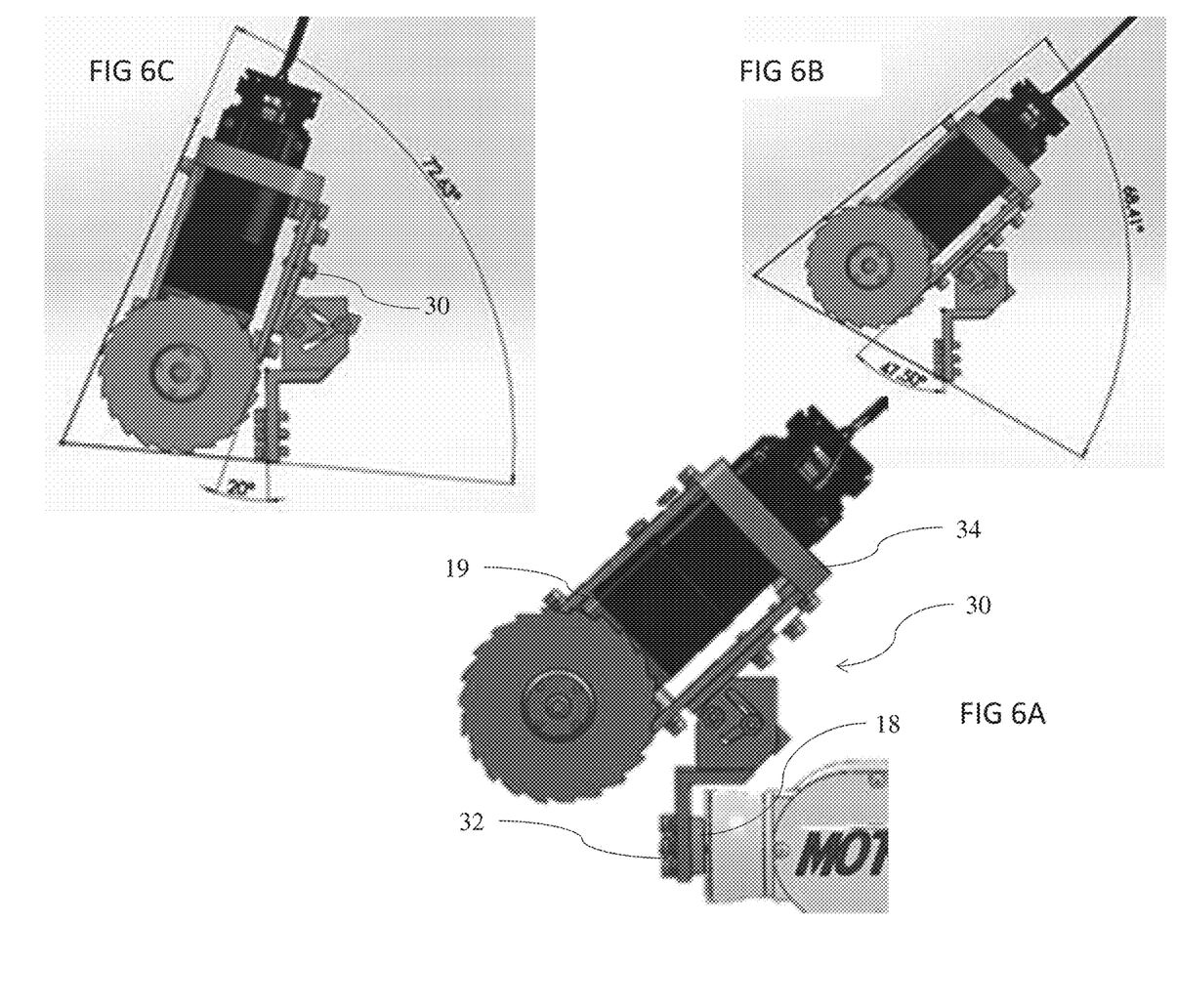
FIG. 6A is a depiction of an exemplary tool (circular saw) connected to a Motoman manipulator/robotic arm end-effector via an interface mechanism.
FIGS. 6B and 6C are depictions of the tool of FIG. 6A with markings indicating angle between tool holder and connector mounted on the end effector and the corresponding arc of operation of the tool.

FIG. 6A depicts an exemplary tool (circular saw) connected to a Motoman manipulator/robotic arm end-effector via an interface mechanism 30. The interface mechanism includes a connector 32 mechanically coupled to the end effector 18 and a tool holder 34. The tool is secured inside the tool holder and the tool holder is adjustably fixed to the connector. The angle of the tool relative to the manipulator end effector can be changed by adjusting the angle at which the tool holder is affixed to the connector.

FIG. 6B depicts the tool of FIG. 6A with markings indicating angle between tool holder 32 and connector 34 mounted on the end effector and the corresponding arc of operation of the tool. The angle formed by the saw and the interface mechanism is 47.50°. As a result, and in direct correlation to the aforementioned angle, the arc of operation of the tool (a circular saw, in this case) is 68.41°.

FIG. 6C depicts the tool of FIG. 6A with marking indicating the angle of separation between the tool 19 and the interface mechanism 30 and the corresponding angle of operation of the tool. The angle formed by the tool holder 32 and the connector 34 mounted on the end effector is 20°. As a result, and in direct correlation to the aforementioned angle, the arc of operation of the tool is 72.63°. It is clear that the smaller the angle between the tool and the interface mechanism (which is mechanically coupled to the end-effector and parallel to the distal surface thereof), the greater the arc of movement of the tool. Accordingly, the interface mechanism between the tool and the robot end effector can be manipulated to change the saw angle for optimal operation. In a similar fashion, the angle of the tool can be adjusted to fit different robotic manipulators and/or perform optimally for different orchard crops.

Figure 7:
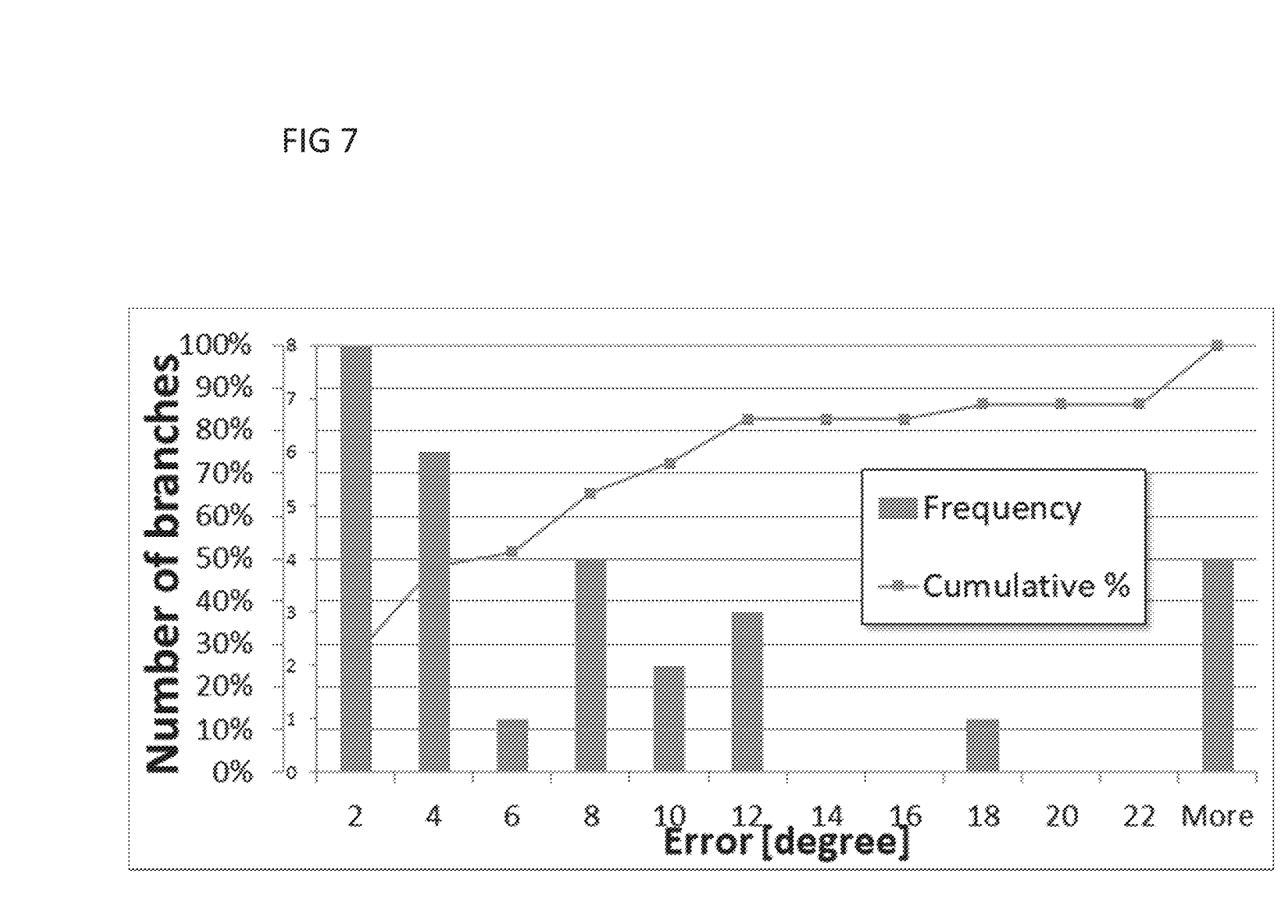
FIG. 7 is a histogram of the angular error in the cutting point.

FIG. 7 depicts a histogram of the angular error in the cutting point. The bars represent the experiment results (histogram) and the curve shows the accumulative percentage. Results show that in 85% of the cases the angular error is lower than 12 degrees, which is an excellent outcome. The graph depicts the branch orientation accuracy with mean of 9.4° and median of 5.75°.

Figure 8A:
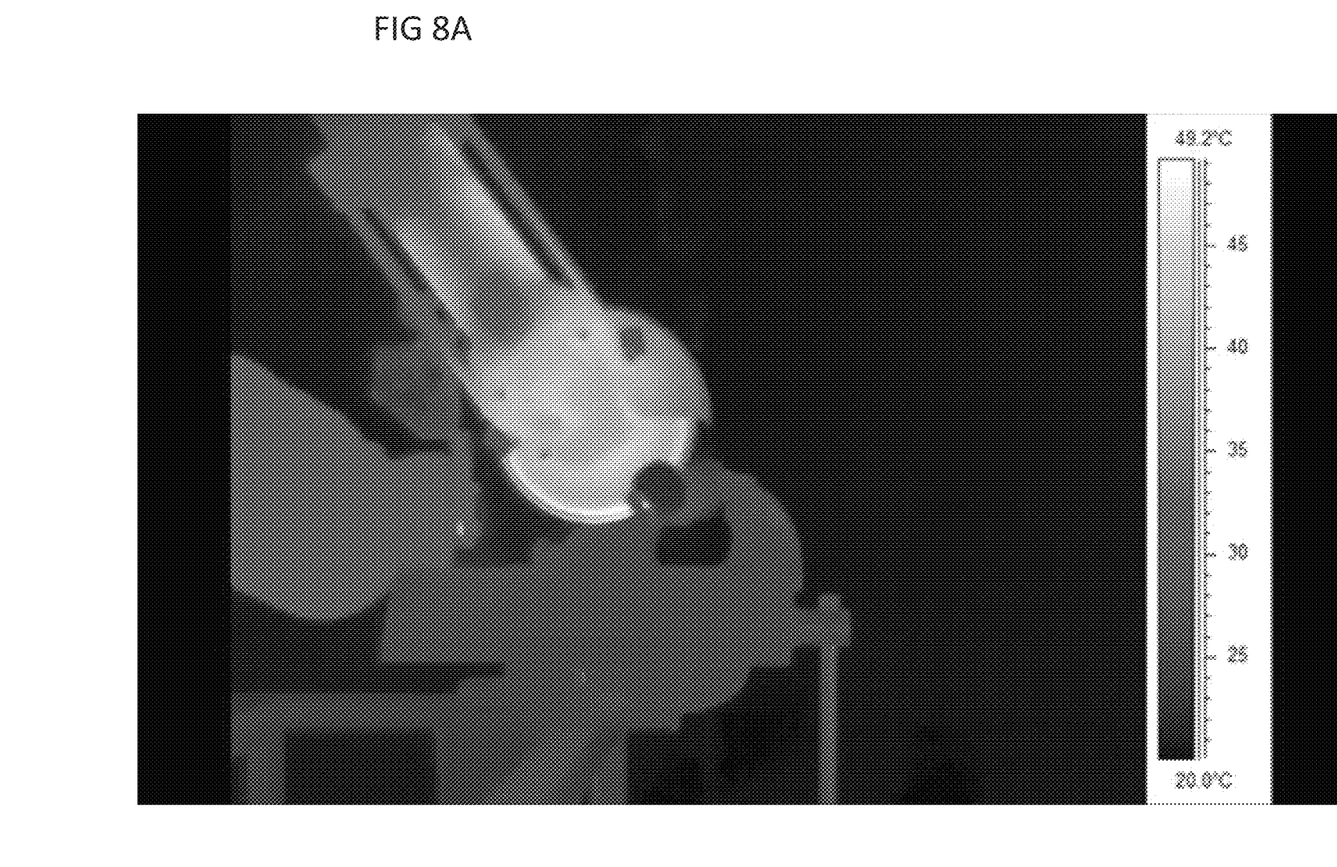
FIGS. 8A and 8B are thermal images of a branch being cut by the tool.
Figure 8B:
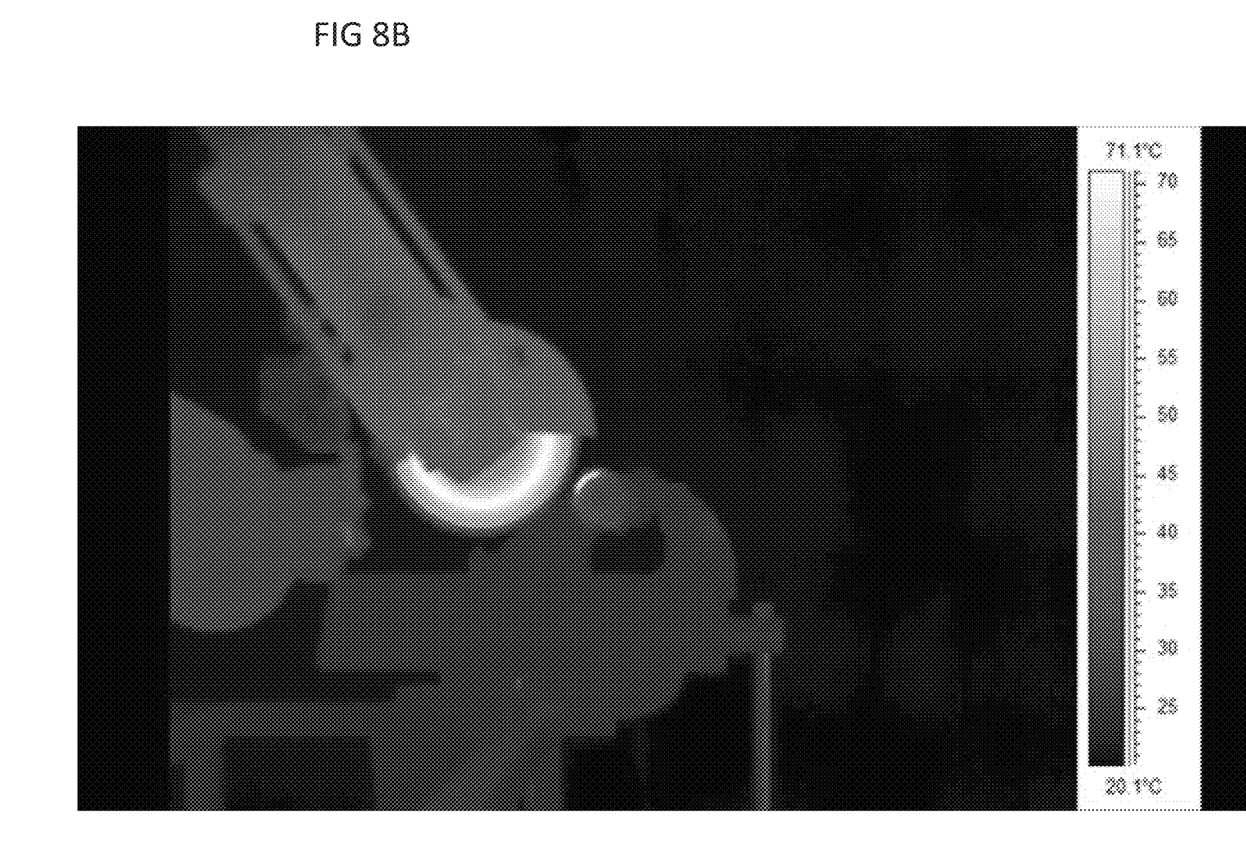

FIGS. 8A and 8B are thermal images of a branch being cut by the tool. The images show that the branch cut location heats up to a temperature of about 120° C. during the pruning operation. The implication is that the cut location itself may be sterilized to some degree by the cutting process.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A human-robot system for performing an agricultural task, the system comprising:
   a robotic manipulator with an agricultural tool coupled to an end effector thereof;
   an imaging device adapted to capture imagery of a target, said imaging device mechanically coupled to said end effector;
   a laser distance sensor adapted to measure a distance between said manipulator and said target, said laser distance sensor mechanically coupled to said end effector and collocated with said imaging device; and
   a control unit including: a processing unit, a monitor and a human-machine interface (HMI), wherein said processing unit is configured to display said imagery on said monitor and to receive markings from said HMI and calculate a trajectory for said manipulator to perform the agricultural task with said tool;
   wherein said trajectory includes instructions for moving said manipulator from a scanning or homing location to an execution location at which said agricultural tool effects the agricultural task on said target at a location corresponding to said marking on said image of said target, and wherein said instructions for moving said manipulator are calculated in robot joint space wherein said robot joint space is defined by a vector whose components are translational and angular displacements of each joint of a robotic link of the robotic manipulator.

2. The system of claim 1, wherein said processing unit is further configured to:

receive said measured distance from said laser distance sensor, and provide instructions to said manipulator for performing the agricultural task with said agricultural tool based on said markings.

3. The system of claim 1, wherein said markings include marking a target point on said imagery of said target.

4. The system of claim 3, wherein said markings further include marking a tool orientation for performing the agricultural task.

5. The system of claim 1, wherein said instructions include instructions to said manipulator to move along said trajectory.

6. The system of claim 1, wherein an orientation of said target is extracted from said target imagery using a computer vision algorithm.

7. The system of claim 6, wherein a desired orientation of said agricultural tool is calculated using said computer vision algorithm.

8. A human-robot method for performing an agricultural task, the method comprising:

providing a robotic manipulator with an agricultural tool, an imaging device and a laser distance sensor manually coupled to an end effector of said manipulator;

receiving, at a control unit, imagery of a target from said imaging device;

marking, using a human-machine interface (HMI) of said control unit, a target point on said imagery of said target;

receiving, at said control unit, distance information from said laser distance sensor;

calculating, by said control unit, a trajectory for said robotic manipulator to traverse from a scanning location to an execution location at which said agricultural tool is able to effect the agricultural task on said target at said target point, wherein said trajectory is calculated in robot joint space, said robot joint space being defined by a vector whose components are translational and angular displacements of each joint of a robotic link of the robotic manipulator; and effecting the agricultural task by moving said robotic manipulator and applying said agricultural tool to said target point of said target.

9. The method of claim 8, further comprising: extracting an orientation of said target from said target imagery using a computer vision algorithm.

10. The method of claim 9, further comprising: calculating a desired orientation of said agricultural tool using said computer vision algorithm.

11. The method of claim 8, further comprising marking a tool orientation for performing the agricultural task using said HMI.

* * * * *